United States Patent
Wild

[15] 3,705,310
[45] Dec. 5, 1972

[54] LIQUID CRYSTAL VOLTAGE DISPLAY DEVICE HAVING PHOTOCONDUCTIVE MEANS TO ENHANCE THE CONTRAST AT THE INDICATING REGION

[72] Inventor: Peter Wild, Wettingen, Switzerland

[73] Assignee: Brown, Boveri & Company Limited, Baden, Switzerland

[22] Filed: May 24, 1971

[21] Appl. No.: 146,196

[30] Foreign Application Priority Data

May 27, 1970 Switzerland..........................7839/70

[52] U.S. Cl. ......................250/229, 324/92, 324/96, 340/324 R, 350/150, 350/160 LC
[51] Int. Cl..................................................G02f 1/16
[58] Field of Search ........350/150, 160 LC; 250/229; 340/324 R; 324/92, 96, 113; 315/55, 169 R

[56] References Cited

UNITED STATES PATENTS 3,149,281 9/1964 Lieb........................................324/96
3,667,039 5/1972 Garfein et al...........................324/92

OTHER PUBLICATIONS

Soref: "Electronically Scanned Analog Liquid Crystal "Displays," Applied Optics, Vol. 9, pp. 1323–1329, June, 1970.

*Primary Examiner*—Ronald L. Wibert
*Assistant Examiner*—Edward S. Bauer
*Attorney*—Toren and McGeady

[57] ABSTRACT

In the optical display disclosed, a pair of flat electrodes sandwich a two-dimensionally extending electro-optical medium that exhibits one optical characteristic in an area subjected to a voltage in excess of a threshold voltage and another optical characteristic where subjected to a voltage less than the threshold voltage. A potential gradient is applied along one electrode and segment wise constant voltages applied to the band electrode so that the voltage to which the medium is subjected varies locally from below to above the threshold voltage. The voltage to be displayed is added to the voltage on one electrode so that the threshold level and the boundary between the zones moves along the medium with the voltage to be displayed. The band electrode is formed of discreet bands parallel to the zone-separating boundary. An additional constant voltage is applied lengthwise across each band. A portion of each band is photo-resistive. When this portion senses the one zone that is subject to the higher voltage it increases the voltage applied locally to the medium in the form of a positive feedback. This accentuates the steepness of the threshold. Photosensitive means also change the applied voltages in response to changes of the threshold level. For this purpose circuit means respond to the photosensitive means by changing the applied voltages.

19 Claims, 5 Drawing Figures

INVENTOR
PETER WILD

INVENTOR.
PETER WILD

LIQUID CRYSTAL VOLTAGE DISPLAY DEVICE HAVING PHOTOCONDUCTIVE MEANS TO ENHANCE THE CONTRAST AT THE INDICATING REGION

REFERENCE TO COPENDING APPLICATION

This application relates to the copending application of Peter Wild filed Mar. 16, 1971, provisionally accorded Ser. No. 124,783 and entitled VOLTAGE VARIABLE OPTICAL DISPLAY and to my application Ser. No. 145,250 entitled OPTICAL DISPLAY filed concurrently with the present application. The content of both of these applications is hereby made a part of this application as if fully recited therein.

BACKGROUND OF THE INVENTION

The present invention relates to means for displaying measured voltages, and particularly to arrangements for displaying measured voltages with an electro-optic indicating medium extending two-dimensionally between two energized electrodes.

Such an indicating medium exhibits one optical characteristic such as feeble depolarization or high transparence in those areas subjected to voltages less than a threshold value, and another characteristic in areas subjected to voltages greater than the threshold. It is possible to produce zones of two different characteristics in the indicating medium by generating a voltage drop along at least one of the electrodes in the direction perpendicular to the boundary between the zones and by maintaining the other electrode at an equipotential value. The resulting controlled local voltage distribution along the medium reaches the threshold voltage at the boundary between the zones. Varying the voltage shifts the boundary.

As used herein terms such as "zones of two different characteristics" refer to zones one of which may have or be characterized by having less depolarization than the other zone. Also, for example, the two characteristics of the two zones can be more transparence and less transparence.

One of the beforementioned copending applications describes an arrangement in which an indicating medium of the aforestated kind extends two dimensionally between two electrodes at least one of which is transparent. One of the electrodes constitutes an electrically equipotential surface. The other electrode exhibits a surface resistance such that a well defined voltage gradient can be developed along it. Preferably the medium is a nematic liquid crystal, for example, MBBA (4-Methoxy-4'-n-Butyl-Benzylidene-Aniline), or p-(p-Ethoxyphenylazo)-Phenylheptanoate or Enanthic acid-p-(p')Ethoxyphenylazo-Phenylester, as described in Journal de Phusique, Volume 30, pages 104–109, November-December 1969, and in U.S. Pat. No. 3,322,485.

In one embodiment of a copending application, a voltage source subjects the electrode operated as the equipotential surface to a control voltage which corresponds to the sum of the threshold voltage and the measured voltage. Along the other electrode, which has a predetermined surface resistance, a source produces a voltage drop by applying different control voltages at each edge thereof. The control voltages are selected so that within the indicating medium between the electrodes, the control voltages produce a local voltage distribution within the medium which drops off linearly from the threshold level when the voltage to be measured is zero.

When the measured voltages fall within a predetermined measurement range, the linearly decreasing voltage distribution is displaced parallel to itself in the direction perpendicular to the plane of the medium. As it is displaced it exceeds the threshold voltage which defines the boundary between the two zones of different optical characteristics such as transparence or depolarization. The moving voltage distribution causes the boundary to migrate along the local coordinate in proportion to the values of the measured voltage. In this fashion the measured voltage can be represented in an analog manner by the length of a "bar".

In another embodiment of this arrangement the measured voltage is applied to the edge of one electrode in such a way that the total voltage gradient along the electrode is proportional to the measured voltage. Thus varying the measured voltages changes the slope of the straight line representing the local voltage distribution. The interface between the zones or regions having different optical characteristics or states is displaced in inverse proportion to the measured voltage.

In the proposed arrangement it is necessary that the particular type of characteristic or state such as transparence, or depolarization, which is changed in the indicating medium from one zone to another should be, as far as possible, a steep, non-linear function of the effective voltage at the threshold level. The latter should also be as clearly defined as possible. However, many materials which, on other grounds, could be convenient for use as indicating media, do not exhibit clearly defined thresholds. Also, many materials which might otherwise be suitable for indicating media, exhibit threshold values that vary. In particular, some materials have threshold values which are temperature dependent or dependent upon chemical changes in a substance or both.

It is an object of this invention to reduce the disadvantageous influences of these material properties upon the accuracy of the display.

Another object of this invention is to improve displays of this type.

For purposes of this discussion the zone which is generated by voltages in excess of the threshold level may be called the optically distinguished zone, and the boundary between the zones may be called the limit of the optically distinguished zone. The characteristic of this zone may also be call the activated state of the zone.

Still another object of the invention is to reduce inaccuracies in the boundary of the optically distinguished zone due to threshold levels which are not clearly defined.

Yet another object of the invention is to reduce inaccuracies in the limits of optically distinguished zones due to threshold levels that shift in response to chemical changes or other changes.

SUMMARY OF THE INVENTION

According to a feature of the invention these objects are achieved in whole or in part by forming one electrode of adjacent bands extending transversely of the potential gradient along one electrode and substantially parallel to the boundary of the optically distinguished zone, by applying a potential difference between one electrical connection to all the bands on one end of the bands and another electrical connection connected to all the bands on the other ends, and by forming the bands of a first section composed of a resistor of fixed resistance, a second section having high conductivity, and a third section as a light sensitive resistor which can be illuminated by the indicating medium.

By virtue of this feature, the locally active voltage in the medium, and the optical state or characteristic of the optically distinguished zone, are simultaneously intensified. This is the result of an optical-electrical positive feedback. The intensification is in contrast to the remaining area of the indicating medium, that is in contrast to the other zone, up to a saturation value. Thus, optically an effect is produced of the kind which would occur if the indicating medium were normally characterized by a threshold defined by a steep non-linear increase.

According to another feature of the invention mutually oppositely disposed secondary electrodes adjoin the first and the second of the two electrodes. The first of these secondary electrodes is at a potential which is constant along the indicating direction and independent upon the measured voltage. However, this potential is varied jointly with the potential of the first main electrode. The second secondary electrode has a voltage characteristic which rises linearly opposite to the indicating direction.

In the neighborhood of the secondary electrodes, two photo detectors are arranged adjacent to one another. These photodetectors act via a control circuit to produce an increase or decrease in the potential of the first secondary electrode until one photo detector is illuminated and the other is not. By virtue of this feature changes in the threshold value of the indicating medium, resulting from chemical changes and other changes, are accompanied by compensation of the local voltage distribution across the indicating medium. Thus, the boundary between the two zones, i.e., the limit of the optically distinguished zone, which indicates the measured voltage, remains unaffected by the change in the threshold level.

According to another feature of the invention, the temperature of the indicating medium is stabilized when using a nematic liquid crystal by placing a cholesteric liquid crystal in the medium. A temperature control circuit is then provided. The signal for the actual temperature value is supplied to the temperature control circuit by a spectrally selective photo detector assigned to the cholesteric temperature sensing medium.

These and other features of the invention are pointed out in the claims forming a part of this specification. Other objects and advantages of the invention will become obvious from the following detailed description when read in light of the accompanying drawings.

BRIEF DESCRIPTION OF THE DRAWINGS

FIG. 1 essentially represents a view from below FIG. 3a and a detail of FIG. 2;

FIG. 3a is a graphical representation of a detailed top view of an arrangement corresponding to that of FIG. 2 and embodying other features of the invention;

FIGS. 3b through 3e are voltage diagrams illustrating the voltages along X direction of the apparatus in FIGS. 2 and 3a as well as the light intensity in the X direction of FIGS. 2 and 3a;

FIG. 3f is an illustration of an indication and compensating system for the arrangement in FIG. 3a;

DESCRIPTION OF PREFERRED EMBODIMENTS

Figure 1:
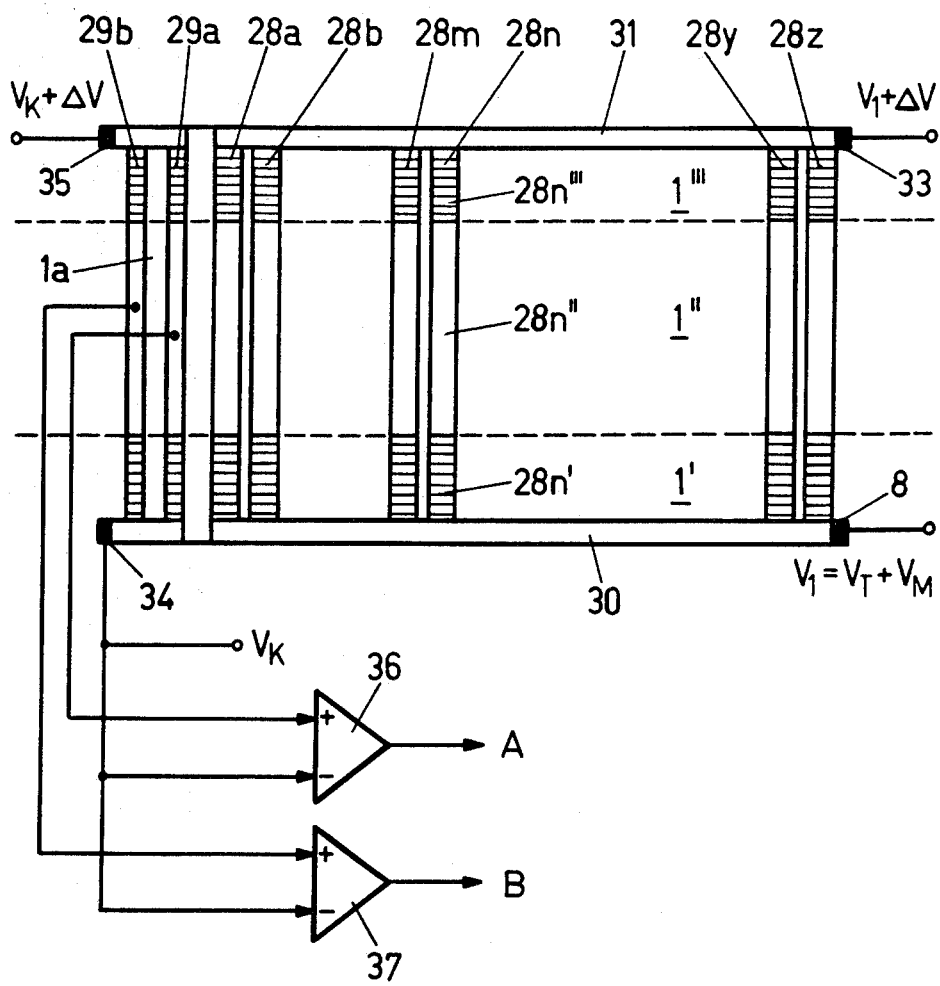
FIG. 1 is a somewhat schematic illustration of an electrode arrangement used in the environment of FIG. 2, and embodying features of the invention, and constructed to produce positive feedback to improve inadequate non-linearity on the part of the threshold of the indicating medium of FIG. 2 as a function of the effective voltage.
Figure 2:
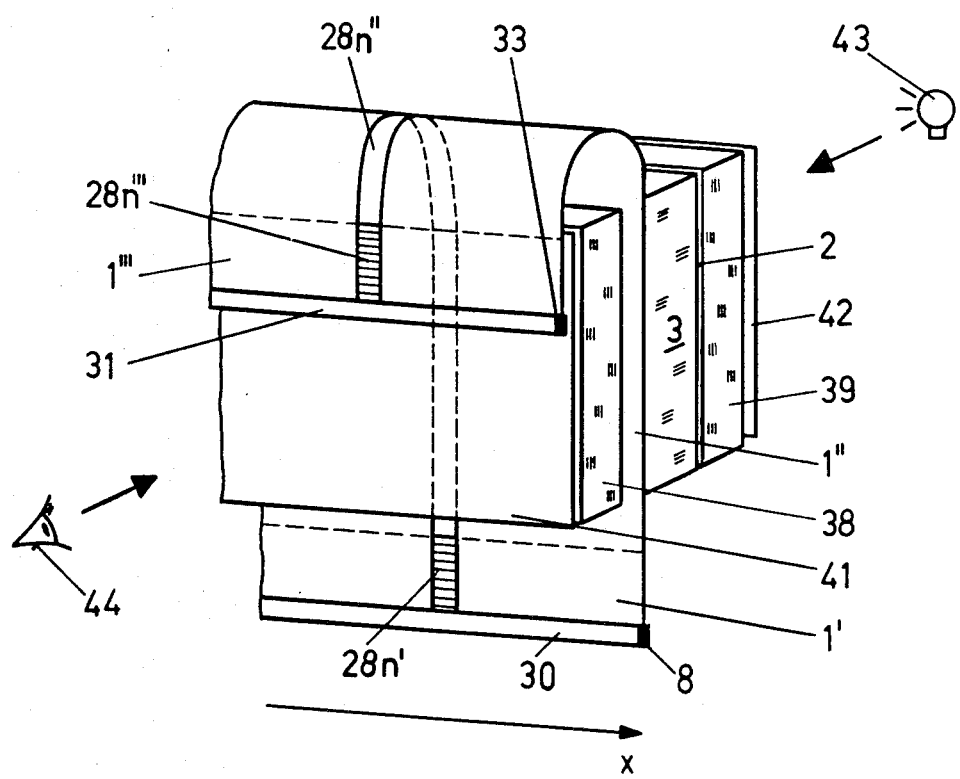
FIG. 2 is a perspective and somewhat schematic illustration of an arrangement embodying features of the invention in which the electrode of FIG. 1 is used.
Figure 5:
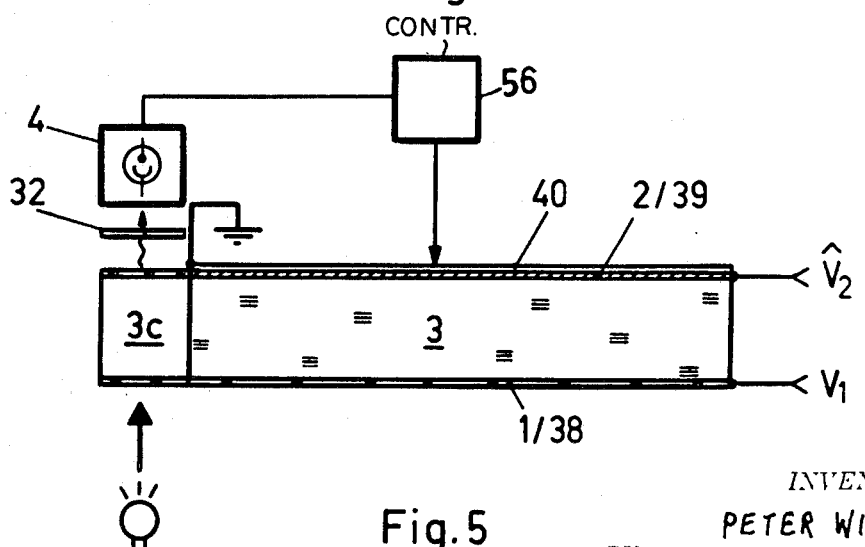
FIG. 5 is a diagram relating to the temperature control circuit employed where the indicating medium is replaced in a subsidiary zone by a cholesteric liquid crystal.

FIGS. 2, 3a, and 5 illustrate two electrodes 1 and 2 sandwiching an indicating medium 3 that extends two-dimensionally between them. FIG. 1 illustrates the electrode 1 separately and in detail.

As shown in FIG. 3b a voltage gradient is produced by voltages applied to left and right end terminals on the electrode 2 to produce a voltage gradient changing from left to right. A voltage substantially equal to the sum of the threshold voltage necessary for changing the characteristics of the medium 3 and the voltage to be displayed is applied to the electrode 1 which is composed of three parts $1'$, $1''$ and $1'''$. These voltages produce a voltage that varies approximately linearly along the medium 3. When no signal to be displayed is applied to the electrode 1 the voltage across the medium 3 at no point exceeds the threshold value. Thus, at no time does an optically distinguished zone appear. When a signal to be displayed is added to the voltage on electrode 1 the voltage across the medium exceeds the threshold value over a zone depending upon the value of the signal to be measured. The boundary of this zone shifts with the variation in the voltage to be measured. The zone then has an optical characteristic different from the optical characteristic of the remaining zone in the medium 3.

The electrode 2 is formed from a transparent layer of constant surface resistance such as a layer of $SnO_2$. Potentials of $V_2$ and zero are applied to the terminals 6 and 7 respectively to form a voltage gradient $V_2(x)$ in the $x$ direction. This gradient is indicated in the right hand part of FIG. 3b.

Figure 3:
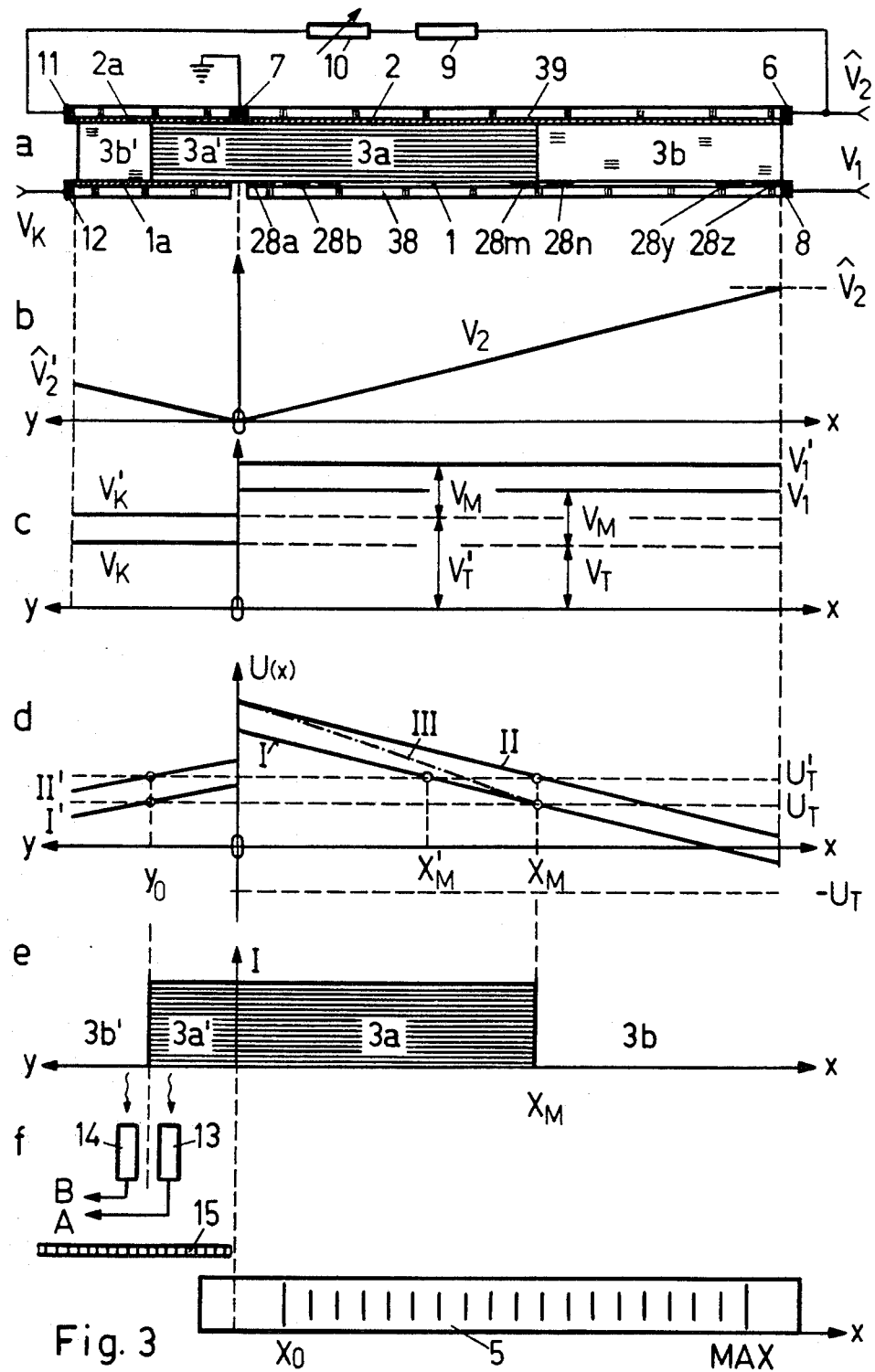

As shown in FIGS. 1 and 3 electrode 1 comprises bands $28a \ldots 28z$ extending substantially perpendicularly to the direction $x$ of motion of the boundary $X_M$ between zones. The bands are electrically connected by means of two bus bars 30 and 31. The bands have a first generally opaque section $1'$ of resistance $R_1$, adjoined by a second, transparent, electrically highly conductive section $1''$. This latter section is followed by a third section $1'''$. The latter is composed of a resistive layer whose resistance $R_3$ depends upon the incident light arising from the indicating medium $3'$. The dependence is such that the original high resistance becomes low when the section is illuminated. The resistance $R_2$ of the conductive section $1''$ is much lower than $R_1$ of the section $1'$. The resistance $R_1$ is substantially smaller than the total resistance of the indicating medium 3.

A terminal 8 connects the bus bar 30 to the voltage $V_1 = V_T + V_M$. The voltage $V_T$ is slightly higher than the threshold voltage $U_T$ of the indicating medium 3. The voltage $V_M$ is the measured voltage. That is to say, it is the voltage which is to be displayed by the display according to the invention. A terminal 33 connects the bus bar 31 to a voltage.

$$V_1 + \Delta V$$

which represents the voltage $V_1$ increased by the voltage $\Delta V$.

The potential of the central band section $1''$, is then $$V_1'' \approx V_1 + \Delta V \cdot R_1/R_1 + R_3$$

The band sections $1''$, as shown in FIG. 2, are in contact with the indicating medium 3 and serve as electrodes. Thus the indicating medium 3 is initially at the voltage $U(x) = V_1'' - V_2(x)$ which decreases linearly in the direction $x$. This voltage passes through the threshold level $U_T$ at $x_M$. $U(x)$ is plotted in the form of curve I in FIG. 3d. The zone marked by $3a$ in FIG. 3e is optically distinguished. That is to say, it is the zone established by the voltage across the medium greater than the threshold level.

The increased light output from the indicating medium in the zone $3a$ reduces the resistance $R_3$ of the third section $1'''$ of any band located in the zone $3a$. Consequently, the potential $V_1''$ of the central section $1''$ rises so that the local voltage $U(x)$ present in the indicating layer is increased and the light intensity intensified further. Thus, a positive feedback effect is produced. The local voltage distribution $U(x)$ then has substantially the form of the curve III in FIG. 3d. The optical effect follows a steep non-linear characteristic.

The indicating medium 3 should be subjected to the potential differences $U(x)$ brought about by the second section $1''$. At the same time the third section $1'''$ should be able to receive the light from the indicating medium 3. To accomplish these ends electrode 1 can take the form of a band-like, flexible, transparent synthetic material foil, coated with tin dioxide ($SnO_2$). In accordance with FIG. 2, a foil of this kind is secured to the indicating medium by a glass plate 38 and curved at the top so that the third section $1'''$ partially overlaps the second indicating zone 3. According to one embodiment of the invention the electrode 2 is applied as a tin dioxide layer to the glass plate 39.

The third section $1'''$ is shielded from environmental light. Inadvertent overlapping onto neighboring bands is avoided by optical decoupling, for example, by the provision of optical partition walls.

If liquid crystals are used for the indicating medium 3, then the entire indicating area, including the coupling section covered by the foil area $1'''$ must be illuminated. According to one embodiment of the invention this is achieved by a light source 43 disposed at the side of the indicating unit opposite the observer 44. (see FIG. 2). Two crossed polarizers are used. One polarizer 42 is inserted between the light source 43 and glass plate 39 for passing light only in the $x$ direction. The other polarizer 41 is located between glass plate 38 and the section $1'''$ of the foil electrode 1. This passes light only in the direction perpendicular to the direction $x$. If no optical scattering takes place in the indicating medium 3 then only a minimum of light can pass the crossed polarizer arrangement. Thus the display is substantially dark as far as the observer is concerned. However, the higher the scattering power of the medium 3 the greater will be the amount of light which is transmitted due to depolarization to the side at which the observer is stationed.

The light coupling section is also masked off vis-a-vis the observer.

In FIG. 3, the band electrode 1 and the electrode 2 with the uniform resistive layer, each adjoin a secondary electrode $1a$ of transparent electrically conductive material and $2a$ with a homogeneous resistive layer, respectively. Main and secondary electrodes 1, 2 and $1a$, $2a$ are preferably made of the same material.

The voltage drop $V_2(x)$ along electrode 2 is produced by application of the voltage $V_2$ to the terminal 6 and grounding the terminal 7 as shown in FIGS. 3a and 3b. The potential distribution in the section $1''$ as shown in FIG. 1, of the electrode 1, produced by application of the voltage $V_1$ to the terminal 8 is illustrated at the right of FIG. 3c. For simplicity's sake the band structure of FIGS. 1 and 2 has been omitted. That is to say the illustration represents the limiting case of an infinite number of bands. The local voltage distribution $U(x)$ in the indicating medium is reproduced by FIG. 3d at the right, curve I. The indicating medium 3 assumes an optical characteristic in the zone $3a$ different from the zone $3b$ as shown in FIGS. 3a and 3e. Zone $3a$ extends from $x = 0$ to $x = x_M$ for $U(x)$ greater than $U_t$. The particular value of the measured voltage $V_M$ is obtained from a comparison of the optically distinguished zone $3a$ with the measurement scale 5. That is to say the value of the voltage $V_M$ to be measured and displayed is indicated by comparing the optically distinguished zone $3a$ with the measurement scale 5.

When the indicating medium 3 is in the form of a liquid crystal layer the voltage $V_2$ should not exceed twice the value of the threshold voltage $U_T$ of the indicating medium. This avoids localized potential differences such as $U(x = MAX)$ exceeding $U_T$ when the voltage $V_M = 0$.

The specific resistance of the electrode 2 is selected so that the current flow between the electrodes 1 and 2 through the indicating medium 3, modifies the linearity of the voltage $V_2(x)$ to an insignificant extent. According to one embodiment of the invention a current density of $2\mu A/cm^2$ may be regarded as typical in nematic liquid crystals in the saturating contrast change range.

A secondary electrode $2a$ on one side of the medium 3 adjacent the electrode 2 is grounded at terminal 7. A terminal 11 connects the secondary electrode to the voltage $V_2$ through resistors 9 and 10. A terminal 12 connects a secondary electrode $1a$ to a chopped voltage $V_k$ whose amplitude corresponds to the voltage $V_T$ on the electrode 1.

These voltages result in the voltage characteristics of FIGS. 3b to 3d at the left. In FIG. 3c secondary electrode 1a is at the potential $V_k$.

The chopping is not indicated. The secondary electrode 2a exhibits the linearly rising voltage characteristics shown in FIG. 3b and extending from zero to $V'_2$. This develops a local voltage characteristic $U(x)$ in the indicating medium 3. This characteristic is of the kind indicated by the curve I' at the left in FIG. 3d.

Figure 4:
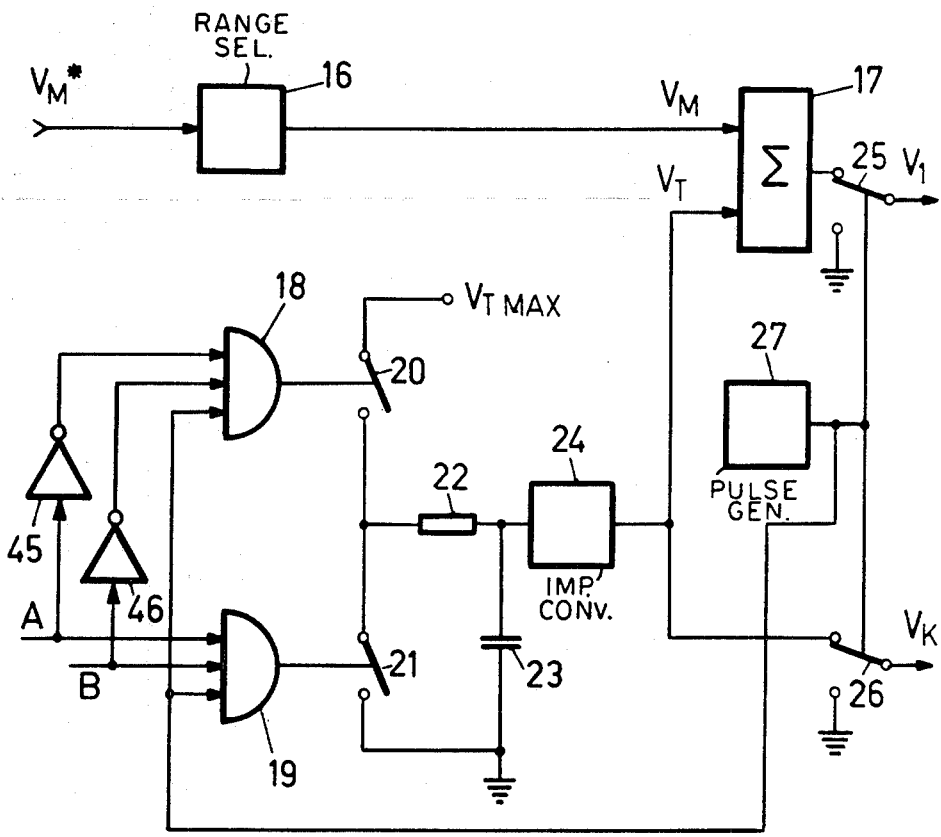
FIG. 4 is a schematic and partial block diagram of a circuit for analyzing the control signals of the embodiments shown in FIGS. 1 to 3 and embodying features of the invention.

If chemical processes within the indicating medium change the threshold value $U_T$ to $U_T'$ as shown in FIG. 3b then the limit $x_M$ of the optically distinguished zone 3a shown in FIG. 3e will shift to the value $x_M'$. This would result in a false indication of the measured value. To prevent such false indication two photo-detectors 13 and 14 are arranged close together in the area of secondary electrodes 1a and 2a. The photo-detectors 13 and 14 are connected to a circuit of the kind shown in FIG. 4. The photo-detectors produce respective logic signals A and B. If the two photo-detectors are illuminated then $A = 1$ and $B = 1$. If they are not illuminated then $A = 0$ and $B = 0$.

Suitable circuits apply the signals A and B to an AND-gate 19. Respective logic inverters 45 and 46 apply the signals A and B to an AND-gate 18. The AND-gate 18 and 19 operate field-effect transistor switches 20 and 21. With the switch 21 open and the switch 20 closed a voltage source $V_{TMAX}$ charges a capacitor 23 through a resistor 22. With the switch 21 closed and switch 20 open the capacitor 23 discharges through the resistor 22. In the holding mode of operation, both switches 20 and 21 are open.

This operation causes an impedance converter 24 to increase or reduce voltages $V_k$ and $V_T$ depending upon the signal conditions of the photo-detectors 13 and 14. A summing element 17 adds the voltage $V_M$ to be measured to the voltage $V_T$. It then supplies the combined voltage to the electrode 1 in the form of a voltage $V_1$ chopped by the switch 25. A switch 26 chops the voltage $V_k$ and supplies it to the secondary electrode 1a. A pulse generator 27 actuates the switches 25 and 26. A measurement range selector 16 in the form of a voltage divider derives the scaled value $V_M$ being displayed from an actual input voltage $V_M^*$ being measured.

When the threshold level $U_T$ changes to become $U_T'$, the boundary $y_0$ of the light bar on the left hand of FIG. 3d shifts towards the coordinate origin point. Thus, both photo-detectors 13 and 14 remain unilluminated and produce signals $A = 0$ and $B = 0$. The inverters 45 and 46 then apply logic ONE signals to the AND-gate 18 so as to close switch 20. This causes capacitor 23 to charge up. The values $V_k$ and $V_T$ then increase. As a result of this the straight lines for $U(x)$ shift upwards as shown in FIG. 3d. With this shift in the straight lines the boundaries of the light bars, that is the boundaries of the optically distinguished zones 3a and 3a' also shift.

The increase in the voltages $V_k$ and $V_T$ continues until the left hand boundary of the light bar 3a' has reached the original value $y_0$ again. This causes re-illumination of the photo-detector 13 so as to develop a signal $A = 1$ and $B = 0$. Thus neither of the AND-gates 18 and 19 are activated. Therefore both switches 20 and 21 remain open. The straight lines II and II' in FIG. 3d intersect the straight line $U_T'$ at the original points $x_M$ and $y_0$ again. This reestablished the correct value $x_M$ for $V_M$. The pulse generator 27 controls the AND-gates 18 and 19 in synchronism with the chopping action of switches 25 and 26.

The mask 15 in FIG. 3f serves to mask off the control photo-detector 13 and 14 and the accompanying control section of the display apparatus from the observer.

Varying the setting of the potentiometer 10 alters the magnitude of the voltage gradient along the secondary electrode 2a. This variability of the resistor 10 and consequent change of the voltage gradient improves the operation in a further respect. It shifts the boundary of the left-hand light bar 3a'. This produces a control process of the type described. Because $y_0$ is determined by the position of photo-detectors 13 and 14 it is only the limit $x_M$ of the zone 3a which shifts. This ability for externally moving the zone limit $x_M$ serves to adjust the limit to the mark $\bar{x}_0$ on the scale 5 when the voltage $V_M = 0$.

In FIGS. 1 and 2 bands 29a and 29b perform the function that is performed by the secondary electrode 1a with the photo-detectors 13 and 14 in the arrangements shown in FIGS. 3a and 3f. The bands 29a and 29b have contact with the conductive band sections 1''. The latter are connected to the non-inverting inputs of two differential amplifiers 36 and 37 (FIG. 1). The outputs of these differential amplifiers are applied to the inverter stages 45 and 46 and the AND-gate 19 of FIG. 4.

The voltage $V_k$ on the bottom bus bar is supplied to the inverting inputs of the differential amplifiers 36 and 37 through a terminal 34. In the quiescent state the band 29a is illuminated while the band 29b is not illuminated. The potential of the band section 29a'' is therefore higher than that of the section 29b''. Thus the output from the amplifier 36 is higher than that from the amplifier 37. We define the signal output of the amplifier 36 as $A = 1$ and the output of the amplifier 37 as $B = 0$ for this condition. Illumination of both bands 29a and 29b produces the signal values $A = 1$ and $B = 1$, without illumination $A = 0$ and $B = 0$. These A and B values act upon the circuit shown in FIG. 4 to increase or reduce the potentials $V_k$ and $V_T$ as hereinbefore described. The electrode 2 of FIG. 2 adjoins a secondary electrode 2a as in FIG. 3a opposite the beforedescribed bands 29a and 29b of FIG. 1.

In , 3 the voltage across the indicating medium has the value $V_1 - V_2$. In the arrangements of FIGS. 1 and 2 the corresponding voltage is $V_1'' - V_2$. Here $V_1''$ is defined as before. The voltage $V_1''$, among other things, is a function of the local luminous intensity I. However, as long as the voltage $V_1'' - V_2$ remains subcritical, that is, the luminous intensity I locally controlled by the indicating medium 3 is too small to substantially reduce the corresponding photo-resistance 1''' the value $x_M$ remains substantially proportional to $V_1'' - V_2$.

Nevertheless, as soon as the electro-optical positive feedback becomes operative this proportionality condition ceases to apply. If the input signal $V_M$ decreases again, then for this reason the display is unable to indicate the new measured value proportionally. Therefore, the pulse generator 27 of FIG. 4 actuates the switch 25 to periodically switch $V_1 = V_T + V_M$ to zero.

For the voltage $V_1 = 0$ the value $V_1''$ is equal at maximum to $\Delta V$. Consequently, $\Delta V$ must not be greater than $U_T$. The indication $V_1 = 0$ thus reverts to the reset condition provided that adequate time is available. However, in order that the observer gets the impression of a continuous display or indication, the reset interval should not last longer than about 30 milliseconds. If the value ΔV is to be made greater than $U_T$ then the terminals 33 and 35 are switched to zero simultaneously with the terminals 8 and 34.

In FIG. 5 a heating resistor 40 heats the indicating medium across the electrode 2/39. The indicating medium 3 includes a cholesteric crystal material in the zone 3c. Such cholesteric liquid crystals alter their spectral reflectivity as a function of a temperature in constant to some nematic liquid crystals which alter their scattering properties as a function of a applied voltage.

As shown in FIG. 5 a photo-detector 4 combined with a color filter 32 detects color changes produced by any temperature changes in the temperature-sensitive medium 3c. The photo-detector influences a controller 56 having a threshold detector. The controller regulates heating of the resistor 40.

The heating system is electrically shielded with respect to the electrode 2/39 by means such as a grounded intermediate metal foil not shown. In this embodiment of the invention, as shown in FIG. 5 the display operates in reflection mode in contrast to FIG. 2 where it operates in transmission mode.

Instead of effecting heating by means of an electrical resistor the same effect can be produced by directing light onto the system from a source whose intensity is regulated.

Measurement of the actual temperature value can, of course, be carried out conventionally using thermocouples.

The bands 29a and 29b form a part of the electrode 1a.

While embodiments of the invention have been described in detail it will be obvious to those skilled in the art that the invention may be embodied otherwise without departing from its spirit and scope.

What is claimed is:

1. An optical display for displaying an input voltage comprising an electro-optic medium, first and second electrode means sandwiching the medium for applying a potential across said medium, said first electrode means being capable of having a voltage gradient established thereacross in a given direction, said second electrode means being formed by a plurality of conductive bands extending transverse to said given direction, first electric means for applying a voltage across said first electrode means for establishing the voltage gradient in said given direction, second electric means for applying a voltage between said first and second electrode means to cause a first light condition in those portions of said medium in which the voltage exceeds a threshold value while the portions of said medium in which the voltage does not exceed the threshold value exhibit a second light condition, said two light conditions forming a boundary between the two portions, input means for varying the voltage across said medium for causing the boundary between the portions exhibiting the first light condition and the portions exhibiting the second light conditions to move along said given direction, each of said bands having a photoconductive extension disposed in the path of a portion of light passing through said medium, and means for applying a potential across each band and its photoconductive extension so that the potential difference between the portions exhibiting the first light condition and the portions exhibiting the second light condition is increased, thereby enhancing the contrast of said boundary.

2. A display as in claim 1, wherein said bands each have a second extension with a fixed resistance higher than the portion of said bands outside said extensions.

3. A display as in claim 2, wherein each of said extensions extend in opposite directions from the remaining portions of said bands.

4. A display as in claim 2, wherein said electric means form the light conditions to which said medium means is subject on the basis of voltages applied to said electrode, and wherein the resistance of said extensions decreases in response to that optical characteristic which increases the voltage across said medium.

5. A display as in claim 2, wherein said bands are transparent between said extensions and form an indicating zone and wherein said extensions are mounted outside of said indicating zone.

6. A display as in claim 5, wherein said first extensions are bent over to partially mask the indicating zone.

7. A display as in claim 2, wherein said medium includes nematic liquid crystals and said electrode means are solid and sandwich said liquid crystals between them to define the extent of said medium, and further comprising a pair of optical polarizing means arranged optically transverse to each other and located along at least one of said electrode means.

8. A display as in claim 2, wherein the first and second light conditions correspond to respective lower and higher voltage ranges within the voltage gradient, and wherein the potentials to be formed by said second electric means between the ends of said bands is within the lower voltage range.

9. A display as in claim 8, wherein said second electric means intermittently place the other of said electrode means at a potential of zero.

10. A display as in claim 9, wherein said second electrical means places said other electrode means at zero potential during intervals of 30 milliseconds and less.

11. A display as in claim 1, wherein said other of said electrode means includes optical partition walls between said bands to decouple said bands optically.

12. A display as in claim 1, wherein said medium includes nematic liquid crystals and said electrode means are solid and sandwich said crystals between them to define the extent of said medium means.

13. A display as in claim 12, further comprising a pair of optical polarizing means arranged optically transverse to each other and located along at least one of said electrode means.

14. A display as in claim 1, wherein said electric means form the light conditions on the basis of voltages applied to said electrode across said medium, and wherein the resistance of said extensions decreases in response to that optical property which increases the voltage across said medium.

15. A display as in claim 1, wherein said electrode means each include secondary electrodes, said electric means forming a voltage gradient along one of said secondary electrodes and a constant voltage across another of said secondary electrodes so as to cause different light conditions in said medium near said secondary electrodes, and further comprising control means including said secondary electrodes and responsive to the light conditions of the medium near said secondary electrodes for varying the voltages of said electric means so as to adjust the voltage gradients and to create one light condition in said medium near one location of said secondary electrodes and another light condition in said medium near another location of said secondary electrodes.

16. A display as in claim 15, wherein said control means includes a pair of photo-detector means each near one of the locations at one of said secondary electrodes and responsive to the light condition of said medium means near said secondary electrodes.

17. A display as in claim 15, wherein said control means includes bands forming one of said secondary electrodes and extending transverse to the voltage gradient formed at said secondary electrodes, and light responsive resistance means on said bands of said secondary electrodes.

18. A display as in claim 1, wherein said medium includes temperature sensitive means and photo-detector means responsive to the condition of said temperature sensitive means, and further comprising temperature control means responsive to said temperature sensitive means for varying the temperature of said medium.

19. A display as in claim 18, wherein said medium includes nematic liquid crystals and wherein said temperature sensitive means includes cholesteric liquid crystals.

* * * * *